United States Patent [19]

Garrett

[11] Patent Number: 4,478,244

[45] Date of Patent: Oct. 23, 1984

[54] MUD SAVER VALVE

[76] Inventor: William R. Garrett, P.O. Box 671, Coldspring, Tex. 77331

[21] Appl. No.: 455,809

[22] Filed: Jan. 5, 1983

[51] Int. Cl.³ .............................................. F16K 15/00
[52] U.S. Cl. ................................. 137/515; 137/68 R; 137/327; 137/527; 166/322; 175/218
[58] Field of Search ...................... 137/68 R, 515, 527, 137/327; 166/322; 175/218

[56] References Cited

U.S. PATENT DOCUMENTS

| | | | |
|---|---|---|---|
| 887,322 | 5/1908 | Fruin | 137/527 |
| 2,163,597 | 6/1939 | Grove | 137/489.5 |
| 2,783,773 | 3/1957 | Rasch | 137/327 X |
| 3,172,424 | 3/1965 | Stillwagon | 137/527 |
| 3,230,971 | 1/1966 | Rosaen | 137/527 X |
| 3,276,471 | 10/1966 | Hagner | 137/527 |
| 3,687,157 | 8/1972 | Whitmer | 137/527 |
| 4,396,034 | 8/1983 | Cherniak | 137/527 X |

Primary Examiner—Harold W. Weakley

[57] ABSTRACT

An operably automatic valve assembly for being received in a cavity of a short drill string subassembly, preferably a kelly saver subassembly, for preventing mud spills when the kelly assembly is disconnected when adding additional sections of drill pipe. An eccentric butterfly disc across the valve opening is biased closed by suitable air spring action. Fluid pump pressure in excess of the bias pressure opens the disc and telescopes closed the air springs located on either side of the valve housing within suitable pockets. A stop on one air spring and not on the other causes a slight twist to the disc as the disc reaches its full open position and eliminates any operating flutter of the disc. Pressure within the stem in excess of the closing bias pressure provided by the air springs keeps the disc open even in the presence of back fluid pressure. Stopping the drilling fluid circulating pump subjects the valve to a sufficiently lower pressure to allow the air spring to close the disc against mud weight of the mud trapped in the kelly assembly. The disc is made frangible for being destroyed in the event a wire line tool has to be run through the valve opening.

1 Claim, 5 Drawing Figures

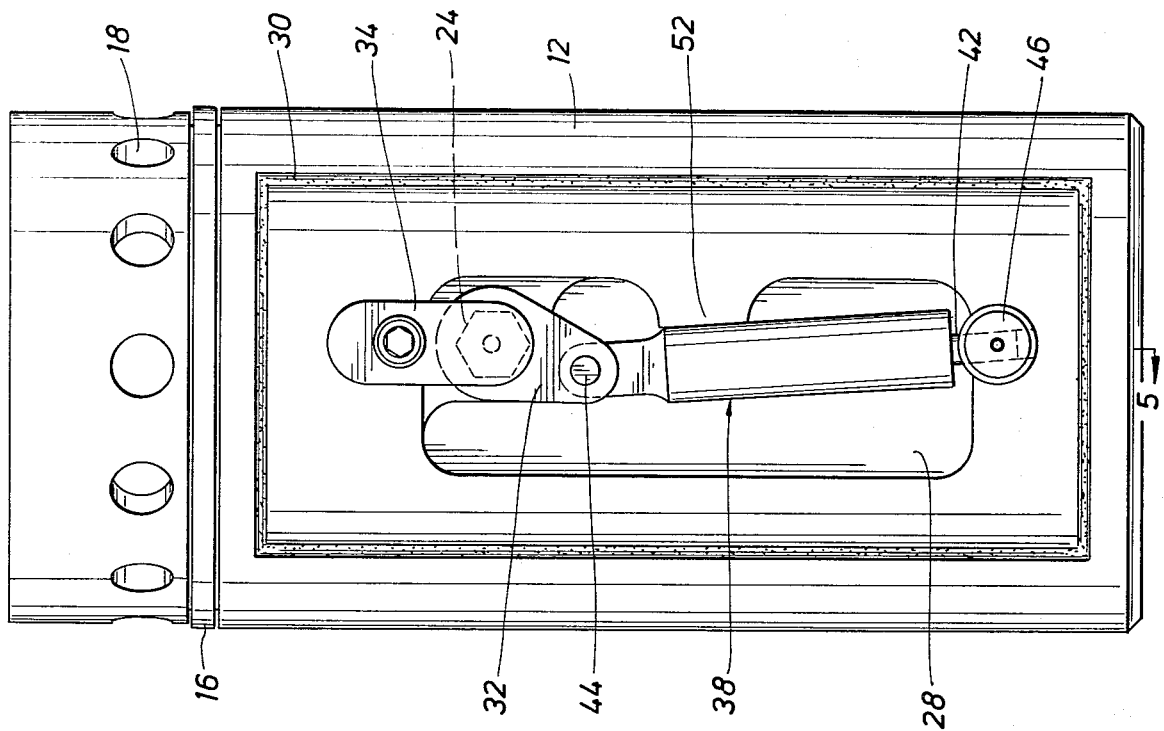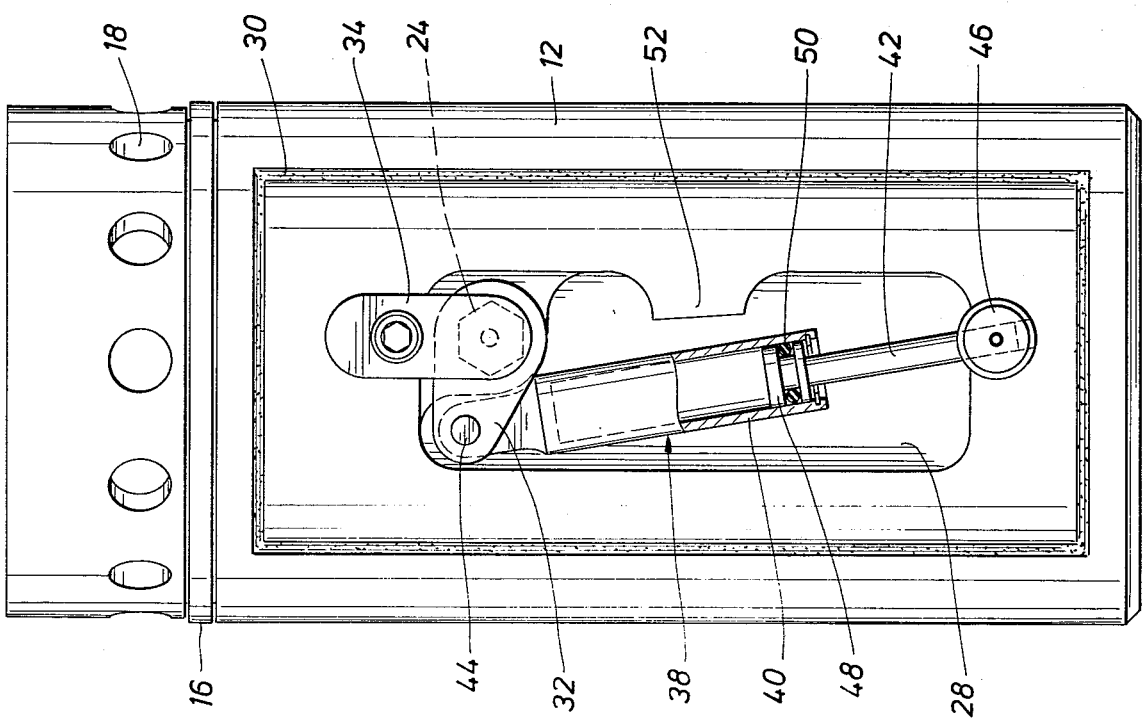

MUD SAVER VALVE

BACKGROUND OF THE INVENTION

1. Field of the Invention

This invention generally relates to valving apparatus useful in a drill string application and more specifically to apparatus that is useful for including in a kelly saver subassembly to substantially reduce mud spills therefrom.

2. Description of the Prior Art

The kelly along with the kelly bushing provides a long spline used in a drilling rig operation as that portion of the assembly that permits connection of new drill pipe joints to the string or stem as the drilled bore hole becomes deeper. For a typically length hole of 12,000 feet, there are approximately 400 connections of 30 foot long pipe that must be made by the kelly or the kelly assembly.

The bore of the kelly, during drilling operation, also accepts drilling fluid or mud on the way from the mud reservoir to the drill string. When it is necessary to "break" the string at the kelly, the pressurizing pump is turned off and the string is disconnected at the kelly for the purpose of either adding a joint of drill pipe as drilling progresses. Each time the kelly is disconnected when it has mud present in its bore, about one-half barrel of the mud is spilled. To prevent this from happening, manual valve closures have been employed. In addition, a somewhat complex automatic device called a kelly foot valve has been developed, which is the subject of U.S. Pat. No. 3,698,411. This device operates satisfactorily, but is longer, more costly and more difficult to maintain than the device described hereinafter.

Generally, a kelly mud saver valve should accomplish the functions described hereinafter. First, as mentioned above, the valve must prevent mud from being released from the bore of the kelly when the lower connection is unscrewed to add another joint or length of drill stem. The pressure of the mud weight due to the hydrostatic head may be up to approximately 100 pounds per square inch and the valve must seal against this pressure to retain the fluid.

When the joint of drill stem is added and drilling operation commences, the primary circulating pump is turned on. Therefore, secondly, the valve must fully open when subjected to a higher pressure than the nominal pressure described above and it must stay open during normal fluid flow so as not to create a substantial pressure drop across the valve.

Third, the valve must not seal against back pressure when the drill stem is all connected together and the stem is pressurized. This is necessary so the pressure gauge on the stand pipe will always indicate if there is any pressure on the threaded connection that is to be unscrewed to add another length of pipe. Unscrewing a threaded connection under pressure is potentially very dangerous. In some conditions where back pressure is occurring, it may be necessary to flow a large volume of fluid upward through the valve; therefore, the valve must remain open under these conditions.

Finally, it is necessary to be able to run a wire line tool through the valve in emergency situations. Therefore, the closure mechanism in the bore must be removable or readily destructable to permit such operation.

The device that is hereafter described performs all of the above functions.

It is therefore a feature of the present invention to provide an improved mud saver valve for automatically substantially preventing mud spills from a kelly assembly, while otherwise permitting ordinary mud operation therethrough.

SUMMARY OF THE INVENTION

The illustrated embodiment of the invention is contained within a housing suitable for fitting into a drilled-out cavity of a kelly saver subassembly. A kelly saver subassembly is used to prevent wear of the kelly resulting from the numerous connections and disconnections of pipe lengths that occur while a well bore is being drilled.

The housing includes a flow-through opening, across which is mounted an off-center or eccentric flapper or butterfly disc. The shaft or axis of the disc extends through the wall of the housing and the ends of the axis are formed into hex-nut heads. An air spring mechanism is connected to each axis end in a suitable pocket located in the outside surface of the housing.

Each of the air spring mechanisms includes a drive pivot arm connected on one end to an axis end and at its other end to an air or pneumatic piston cylinder or rod. Each cylinder is pressurized to about 100 pounds per square inch, which is sufficient under ordinary conditions with the pump shut off to close the butterfly disc. Pressure in excess of the precharged pressures of the cylinders opens the disc, which maintains itself open as the drill stem pressurizes. The valve disc remains open even if back pressure occurs. However, when operating pressure is removed and the downstream side of the valve is less than precharged pressure, the disc is closed by the pressure in the cylinders to "save" the mud existing above the valve.

A stop operating against one of the cylinder prevents absolute full lateral rotation as the disc opens and places a twist or torque bias on the disc axis since the lateral position of the other cylinder is not similarly stopped. This prevents fretting of the disc while it is open and subject to operating fluid flow.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the appended drawings illustrate only a preferred embodiment of the invention and are therefore not to be considered limiting of its scope, for the invention may admit to other equally effective embodiments.

In the Drawings:

FIG. 3 is a side view of the mud saver valve shown in FIG. 1 with the butterfly disc being shown in the closed position.

FIG. 4 is a side view of the mud saver valve shown in FIG. 1 with the butterfly disc being shown in the open position.

DESCRIPTION OF THE PREFERRED EMBODIMENT

Figure 1:
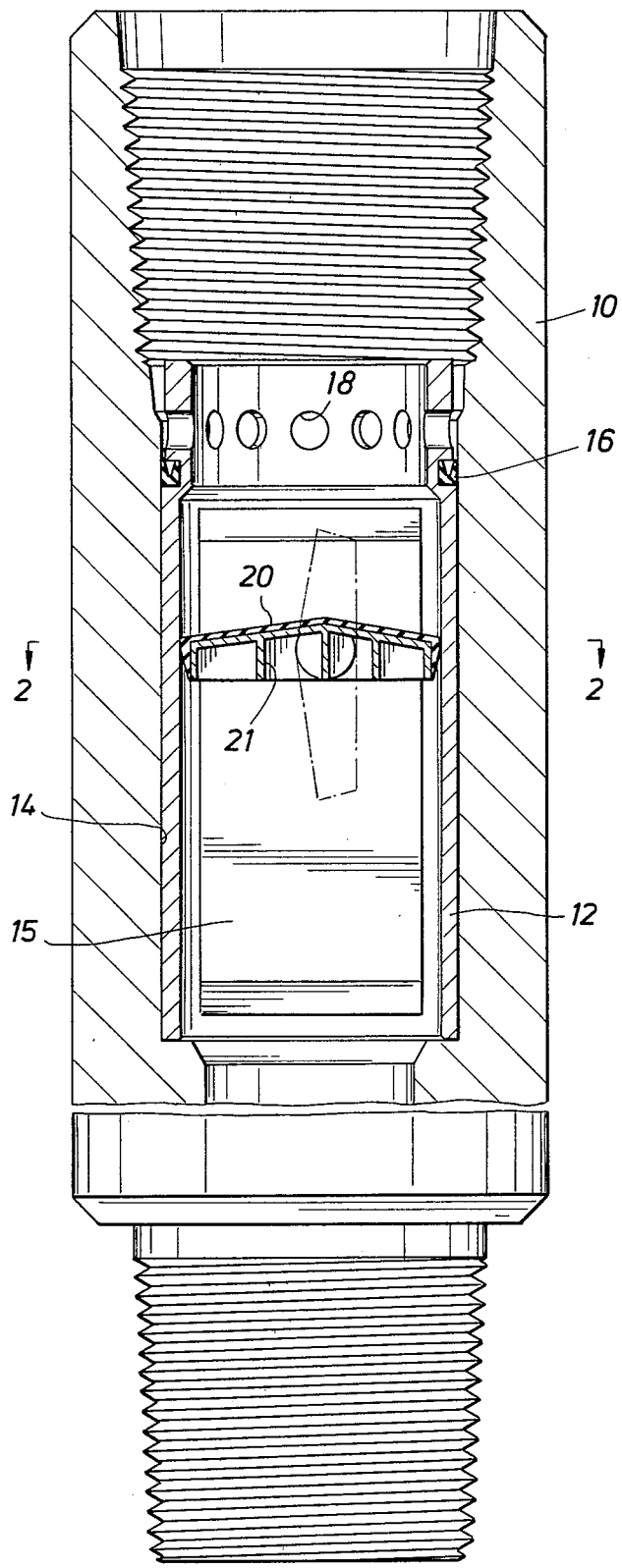
FIG. 1 is a longitudinal cross-sectional view of a mud saver valve embodiment in accordance with the present invention, as employed in a kelly saver subassembly.

Now referring to the drawings and first to FIG. 1, a longitudinal cross-sectional view of a kelly saver subassembly, including a mud saver valve in accordance with the preferred embodiment of the present invention, is shown. Kelly saver subassembly 10 is normally connected to the lower pin end of the kelly. Hence, the box end of the kelly saver subassembly is located at the top and the pin end thereof is at the bottom. A kelly saver subassembly is normally employed so as to prevent excessive connections and disconnections with respect to the kelly during an ongoing drilling operation. For a bore hole of approximately 12,000 feet in depth, there normally would be approximately 400 connections of pipe joints. In the process of making the connection of each of these joints, a pipe joint is disconnected and connected with respect to the kelly saver subassembly. So as to prevent all of these connections from being made on the kelly itself, a kelly saver subassembly is employed, which is replaced or rethreaded after the threads that have been subjected to the wear described above have worn to the degree that the threads are no longer acceptable for on-going service.

In any event, in accordance with the present invention, the central bore of the kelly subassembly in which the mud saver valve is to be located is machine bored to accept the housing of the mud saver valve in its central cavity. Therefore, with respect to the assembly shown in FIG. 1, the center line of housing 12 is concentric with the center line of the bore opening of kelly saver subassembly 10.

As shown in cross-section, housing 12 fits snugly into cavity 14, a V-cup ring 16 or 0-ring being used to seal the housing with respect to the internal wall of the cavity near the upper end of the housing. It may be further seen that the housing extends slightly above the cavity and into the box end of the kelly saver subassembly, lateral holes 18 being provided through the wall of the housing so as to permit fluid flow therethrough and to permit grasping or holding of the housing for extraction or removal from the kelly saver subassembly.

The housing has an axis flow-through opening 15 therethrough. Located across opening 15 is mounted a butterfly or disc valve, sometimes also referred to as a flapper valve. Reference numeral 20 is used to designate the sloping upper surfaces of the butterfly disc, which are covered with nitrile rubber of other similar surfacing material. It should be further observed that the disc is mounted off-center or eccentric with respect to the center line of the opening through the housing. The superstructure of the disc is made of aluminium, plastic or other suitable frangible material, for a purpose which is explained hereinafter.

Figure 2:
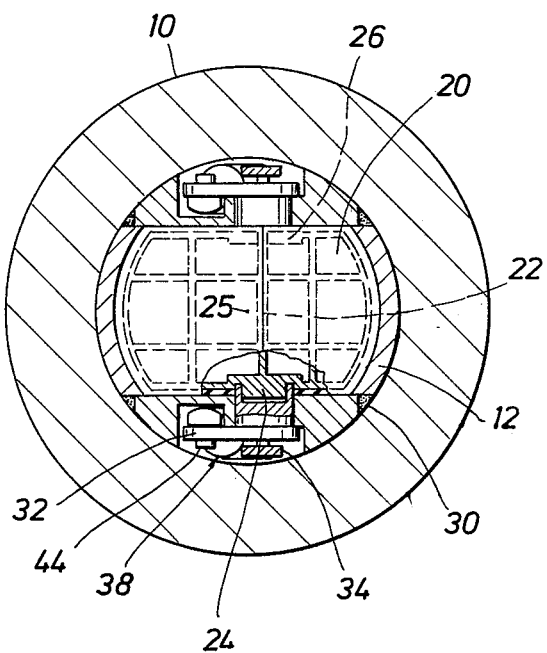
FIG. 2 is a lateral cross-sectional view of the mud saver valve at section 2—2 of FIG. 1, and also showing a cutaway view of one of the axis connections.
Figure 5:
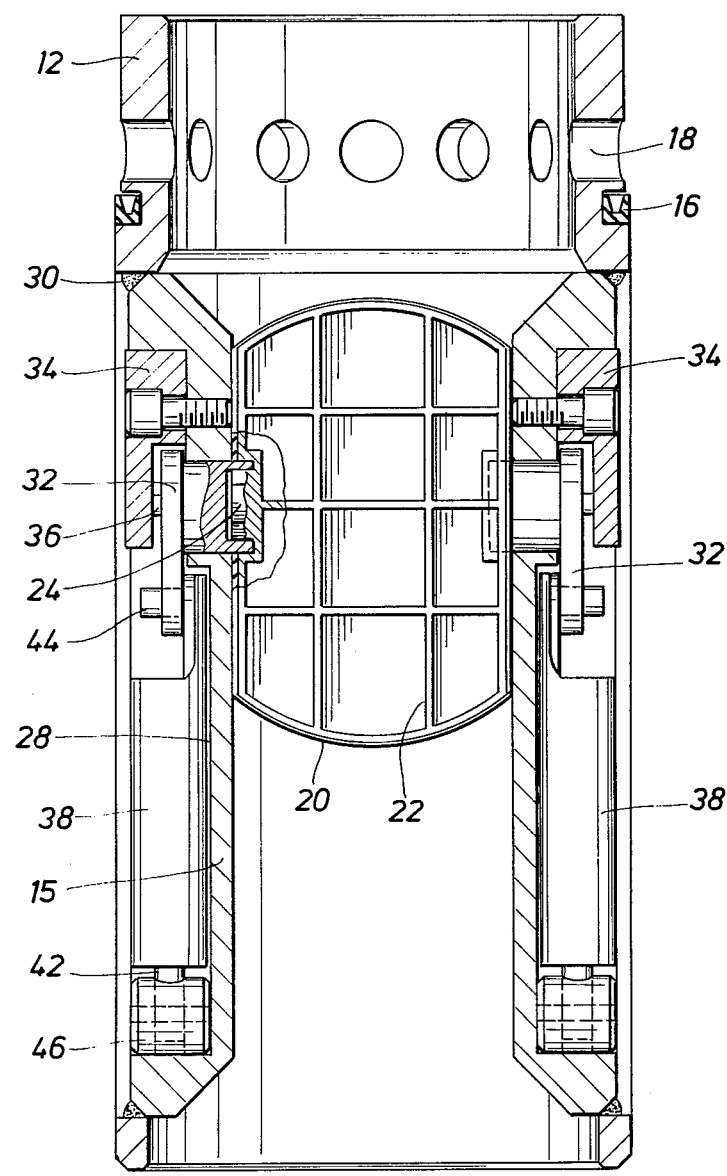
FIG. 5 is a cross-sectional view of the mud saver valve at section 5—5 of FIG. 4.

Now referring to FIG. 2, a cross-sectional view is illustrated which is taken across the top of the butterfly valve in the center part of the drawing, also showing a cutaway view at the upper drive pivot arm at one of the two sides. It may be seen that the valve is generally rectangularly shaped, the short ends thereof being curved in conformity with the generally circular configuration of the housing, which, in turn, is contiguous with the generally circular cavity in the kelly saver subassembly. The sides of the butterfly disc are generally straight. The housing opposite the straight elongated portions of the disc accommodate a pivot arm and piston arrangement to be hereinafter described. It may be seen, therefore, in FIG. 2, that the opening through the housing is not circular but the same shape as the butterfly disc when viewed from the top.

Part of the superstructure of the butterfly disc includes a rotating axis 22 which terminates in a hex-nut head 24 configuration on one end and a similar hex-nut head configuration 26 on the other, each head extending through an opening in the side wall of the housing at its location to enter a side housing pocket. The pockets each accept a drive pivot arm and air spring mechanism.

Now referring to FIG. 3, one of the drive pivot arms and the air spring mechanism connected thereto are illustrated within pocket 28. It may be seen that the pocket subassembly is conveniently separately assembled and then joined to the rest of the housing by welds 30. As mentioned, the axis end which extends into pocket 28 is conveniently in the form of a hex-nut head. A drive pivot arm which includes a hex cup 32 fits over the axis hex-nut head 24 for operational purposes. That is, when drive pivot arm 32 is rotated counterclockwise downwardly as shown in FIG. 3, butterfly disc valve is opened with respect to opening 15 in housing 12. When arm 32 returns to the position shown in FIG. 3, this closes disc 20. A mounting cap 34 is fixedly secured to housing 12 by a suitable machine screw and includes a depending arm. The depending arm accepts a rotation nub 36 on drive pivot arm 32 to permit the arm to turn and to retain the pivot arm in operating position with respect to hex-nut head 24.

An air spring 38 generally comprising a cylinder 40 and a piston rod 42 is mounted in a swivel connection 44 to drive pivot arm 32. As the cylinder telescopes inwardly, a piston pivot 46 at the lower end allows the cylinder to move laterally to the right. Pivot 46 is held within a pocket extension of pocket 28. Piston 42 terminates within the cylinder in piston head 48 and the cylinder is sealed at this point to prevent leakage of air pressure by an 0-ring seal 50.

It should be observed that as drive pivot arm 32 rotates downwardly the piston rod moves within the cylinder and the body of the air spring cylinder moves downwardly and to the right, as illustrated in FIG. 3, until it comes to rest in the near vertical position against lateral stop 52. It should be further noted that the cylinder 40 is stopped in its rotation just to the left with respect to vertical when the butterfly disc is fully opened, as conveniently shown in FIG. 4.

In operation, piston pressure within air spring 38 and the comparable air spring connected to the opposite end of axis 22 apply approximately 50–200 pounds per square inch of pressure to keep butterfly disc 20 closed, or to urge it closed if it should be open. While the lower end of the valve is disconnected and, therefore, subjected to a lower pressure, the disc remains closed and keeps the mud trapped above the valve from draining or spilling.

After the string is again connected to the lower end of the kelly saver subassembly and the mud circulating pump started in operation, disc 20 is opened when the pressure from above the disc exceeds the closing pressure. This opens the disc and collapses or squeezes the cylinder closed. As this occurs, cylinder 40 on the side of housing 12 shown in FIG. 4 moves against stop 52 to limit its lateral movement. Stop 52 contacts cylinder 40 only after disc 20 fully opens. The complementary cylinder in the opposite pocket of the housing does not have a stop and, therefore, moves a little further in the lateral direction until the slight twist or torque imparted thereby on axis 22 causes a binding or freezing of parts. Therefore, even though there is fluid flowing past the butterfly disc, the disc does not flutter or fret.

With the drill stem sealed from the atmosphere and the circulation pump being in operation, the pressure in the stem builds to a pressure of several hundred pounds per square inch in the vicinity of the opened butterfly disc. This keeps the disc open and effectively overrides the pressure provided by the air springs regardless of which way fluid is actually flowing through the opening in the valve housing. Therefore, even the presence of back pressure, and reverse flow due thereto, will not cause the disc to close.

When the circulation pump is shut off, the pressure equalized and the stem is broken open to the atmosphere, then the conditions are again right to cause the air springs to close the disc, as previously discussed.

The disc is slightly eccentric or mounted off center for rotational purposes, as shown in FIG. 2, by the distance that rotating axis 22 is away from center 25 of the disc. This provides opening of the disc and an air foil affect on the disc as it opens so that it quickly opens and has an additional force while the fluid is flowing to maintain the disc in its open condition. Also, as a result, the disc provides very little pressure head resistance to the circulation pump.

The disc is made of a frangible material, such as aluminum, ceramic, hard plastic or fibrous composition. If a wire line tool must be run through the valve, a sinker bar can be used as an impact device to break up and destroy the disc before running the wire line tool through the valve opening.

In addition, the disc is also conveniently covered with a thin coating of nitrile rubber or other elastomeric material to seal in the inner surfaces of the valve housing when closed and to resist erosion under fluid-flow operation.

Housing 12 includes holes 18 at its upper end located slightly in the box end of the kelly saver subassembly in which the housing is located. Mud flows through these holes above the sealing effect of seals 16. However, some detritus material will work down into the side pockets of the housing after a period of time, to require removal and cleaning thereof before the valve can be returned to service.

Also, as mentioned above, the kelly saver subassembly wears out in use and must be replaced. Holes 18 permit an extraction tool to grasp the housing for removal purposes.

The housing is made of stainless steel or other heat treatable alloy steel and is conveniently dimensioned for operation to fit either into a 4½" drill stem or a 5" drill stem, although it can be dimensioned for other operating drill stem application.

While a particular embodiment of the invention has been shown and described, it will be understood that the invention is not limited thereto, since modifications may be made and will become apparent to those skilled in the art. For example, the air springs that have been described are preferred for use as the springs, ordinarily each being precharged with a pressure of about 100 pounds per square inch. However, other springs, partially or not including air spring parts, may be employed, if desired. Springs that are entirely mechanical may be employed, if desired. Also, pivot arm 32 provides a convenient means for connection directly to the axis extension for driving the butterfly disc. However, a clock spring arrangement may be employed instead, if desired.

What is claimed is:

1. A mud saver valve for being received into a tubular drill pipe subassembly, comprising:
   (a) a housing having a flow-through opening longitudinally aligned with the bore opening of the drill pipe assembly;
   (b) a butterfly disc pivotally mounted across said opening;
   (c) a rotating axis for pivotally mounting said disc, at least one end of which extends through the side wall of said housing to form an axis extension;
   (d) spring means mounted to said axis extension for providing biasing torque for operating said disc closed, opposing operating pressure through said flow-through opening causing excess biasing torque to be required for operating said disc open;
   (e) a drive pivot arm connected to said axis extension, said spring means being mounted to axis extension via said drive pivot arm;
   (f) the second end of said rotating axis extending through the housing side wall to form a second axis extension, and including a second drive pivot arm connected to said second axis extension, and second spring means mounted to said second drive pivot arm for providing additional biasing pressure for operating said disc closed, opposing operating pressure through said flow-through opening in excess of said biasing pressure provided by said first-named spring means and said second spring means being required for operating said disc open;
   (g) said housing including a first side pocket for accommodating said first-named drive pivot arm in said first-named spring means and a second side pocket for accommodating said second drive pivot arm and said second spring means;
   (h) said spring partially laterally moving with the opening of said disc and the rotation of said first-named drive pivot arm and said second drive pivot arm; and
   (i) a stop included in said first side pocket for limiting the lateral movement of said first-named spring, thereby providing more lateral movement of said second spring than said first-named spring with the opening of said butterfly disc and providing torque to said axis to substantially prevent fretting of said butterfly disc while in the open position.

* * * * *